Jan. 27, 1931.                J. SACHS                1,790,322
                    ELECTRIC METER SERVICE APPLIANCE
                    Filed Jan. 11, 1928        3 Sheets-Sheet 1
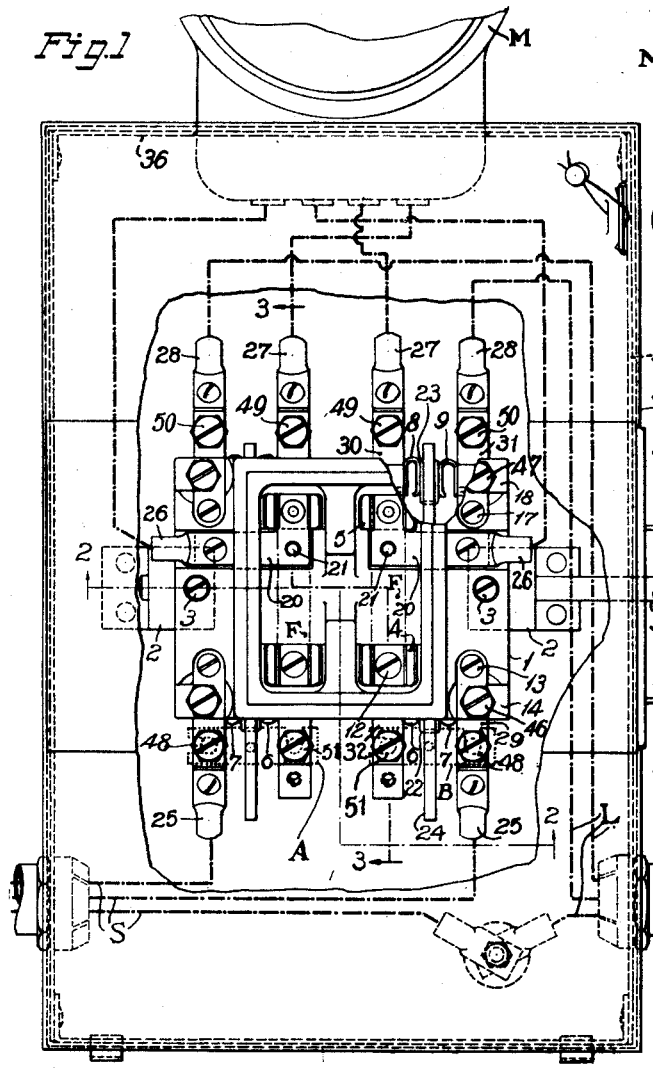
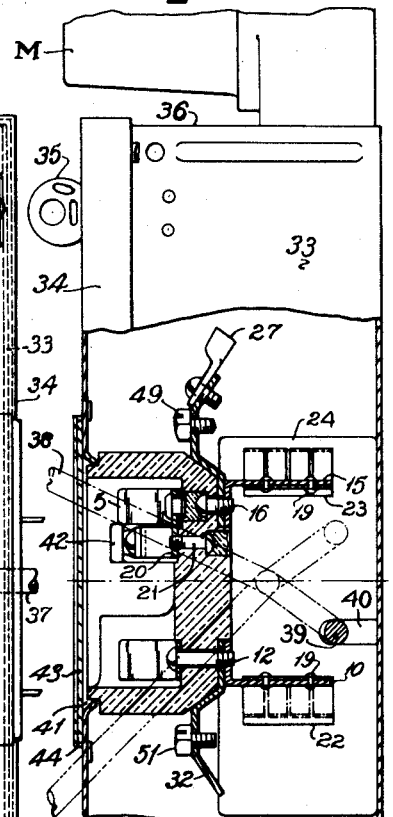
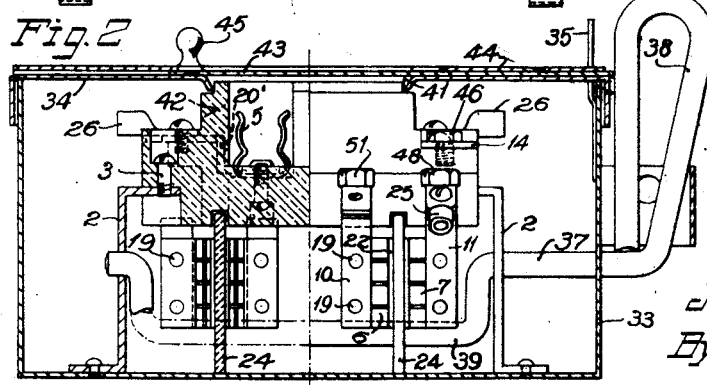
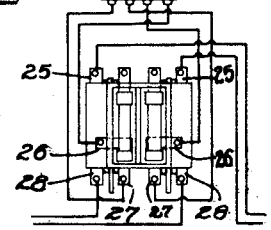
Inventor
Joseph Sachs
By S. Jay Teller
Attorney Jan. 27, 1931. J. SACHS 1,790,322
ELECTRIC METER SERVICE APPLIANCE
Filed Jan. 11, 1928 3 Sheets-Sheet 2
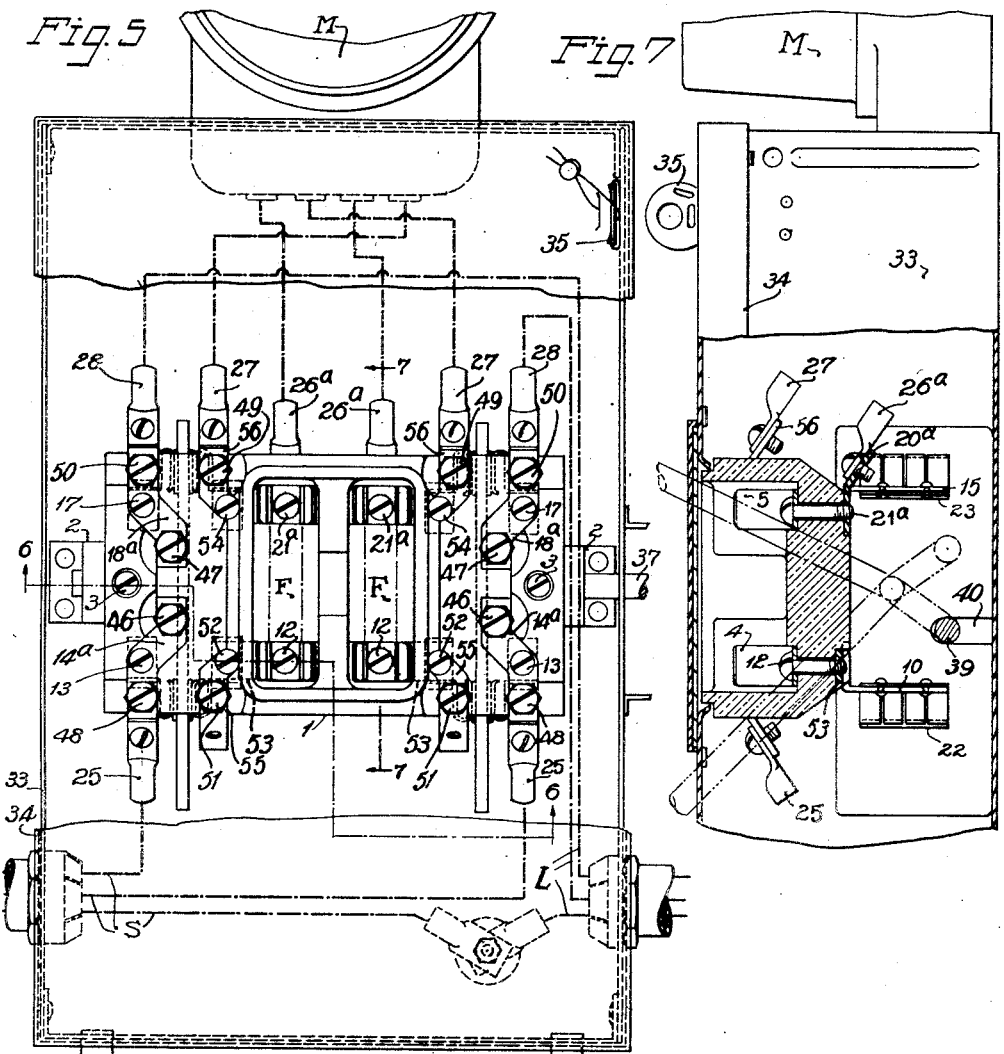
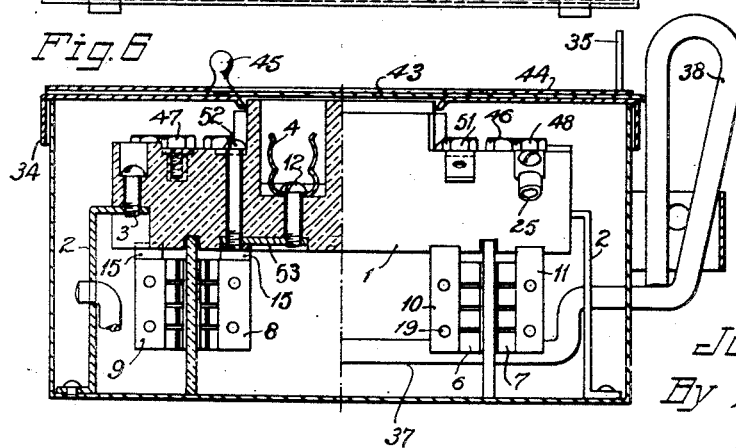
Inventor
Joseph Sachs
By S. Jay Teller
Attorney Jan. 27, 1931. J. SACHS 1,790,322
ELECTRIC METER SERVICE APPLIANCE
Filed Jan. 11, 1928 3 Sheets-Sheet 3
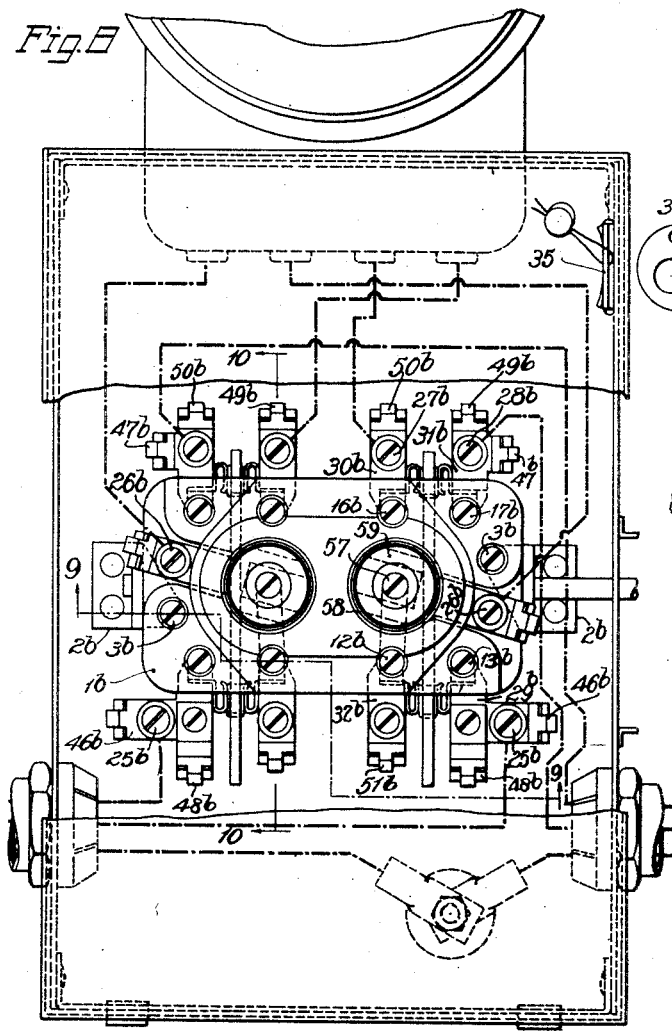
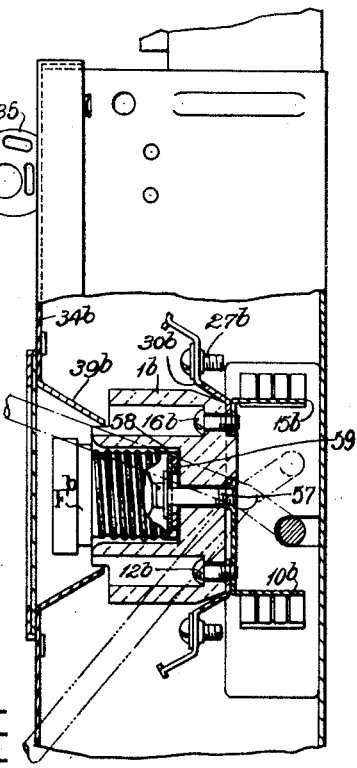
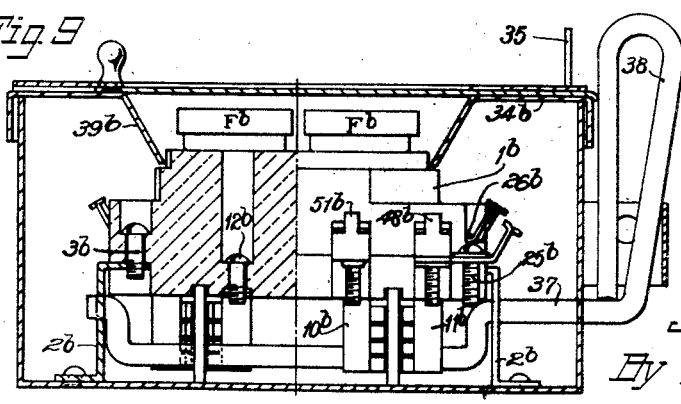
Inventor
Joseph Sachs
By S. Jay Teller
Attorney Patented Jan. 27, 1931

1,790,322

UNITED STATES PATENT OFFICE

JOSEPH SACHS, OF WEST HARTFORD, CONNECTICUT

ELECTRIC-METER SERVICE APPLIANCE

Application filed January 11, 1928. Serial No. 246,012.

The application relates particularly to an electric meter service appliance which is somewhat similar to the constructions disclosed in my patents for electric circuit controlling appliances No. 1,754,443 issued April 15, 1930, and No. 1,757,741 issued May 6, 1930, and in my patent for electric meter service appliance No. 1,757,743 issued May 6, 1930.

In my said Patent No. 1,757,741 I have shown a fused switch having the main base reversible for the purpose of facilitating the changing of the electrical sequence, that is, for providing either a sequence of switch-meter-fuse-switch or a sequence of switch-fuse-meter-switch. The structure illustrated in the said patent includes a supporting device at the rear connected with the switch contacts, the main base being supported and held in place by the supporting element for the said contacts. One of the objects of the present invention is to provide a construction of the type set forth in my said Patent No. 1,754,443 having means permitting the reversal of the main base to change the electrical sequence for the purpose described. In a construction of this type the base is normally supported in fixed relation to the rear supporting wall and the switch contacts are carried by the base independently of any other parts.

An electric meter service appliance of the type to which the invention relates is adapted to be used not only for normal service purposes but also for facilitating the testing of the meter. When the meter is to be tested the normal circuit from the service wires through the meter to the customer's load wires must be interrupted and in order that the customer may not be deprived of service during testing it is customary to provide by-pass connections from the service wires to the load wires. In my aforesaid Patent No. 1,757,743 I have disclosed attachment devices connected to or associated with the service and load wire terminals and adapted for the connection thereto of by-pass devices for the purpose of maintaining the customer's service during testing. These attachment devices as shown in the said patent are supported entirely independently of the main insulating base with which the fuse and switch contacts are associated. Another object of the present invention is to provide a meter service appliance of the type referred having by-pass attachment devices for the purpose set forth supported entirely on the base.

A meter service appliance of the type to which this invention relates is so constructed and connected that the normal circuit is broken both before the meter and after the meter, the meter coil terminals being thus left electrically free so that testing can be effected in any usual or desired way. For some methods of testing, however, it is necessary to maintain a connection between the service wires and the meter, and therefore in my said Patent No. 1,757,743 I have disclosed means for electrically connecting the meter with the service wires when the normal connections of the meter with the said wires have been interrupted by the operation of the switch mechanism. These connecting means as shown in the said patent are supported entirely independently of the main insulating base. A further object of the present invention is to provide a meter service appliance of the type referred to having connecting means for the purpose set forth supported entirely upon the base.

Further objects of the invention will be apparent from the following specification and claims.

In the accompanying drawings I have shown an embodiment of the invention which I now deem preferable but it will be understood that the drawings are intended for illustrative purposes only and are not to be construed as defining or limiting the scope of the invention, the claims forming a part of this specification being relied upon for that purpose.

Of the drawings:

Fig. 1 is a front view of an appliance embodying the invention, a portion of the front cover of the appliance being broken away to show interior parts.

Fig. 2 is a transverse sectional view taken along the line 2—2 of Fig. 1.

Fig. 3 is a fragmentary vertical sectional view taken along the line 3—3 of Fig. 1.

Fig. 4 is a diagrammatic view showing the electrical connections which may be provided when certain parts are reversed from the positions shown in Figs. 1 to 3.

Figs. 5, 6 and 7 are views similar respectively to Figs. 1, 2 and 3 but showing an alternate embodiment of the invention.

Figs. 8, 9 and 10 are views similar respectively to Figs. 1, 2 and 3 but showing still another alternate embodiment of the invention.

An appliance embodying the invention preferably includes a fused switch unit and a casing or cabinet for enclosing the said unit. It will be understood that the parts constituting the fuses and switch devices at the respective sides of the fused switch unit are or may be similar in construction except for reversal of positions. For the sake of brevity I will confine the description so far as possible to the parts at one side.

As illustrated in Figs. 1 to 3 the fused switch unit of the appliance includes an insulating base 1 mounted in normally fixed spaced relationship with a rear supporting wall which may be the rear wall of the enclosing cabinet. As illustrated the base 1 is supported from the said rear wall by means of brackets 2, 2. These brackets enter recesses in the sides of the base, the base being secured to the brackets by means of screws 3, 3.

The fuse contacts are represented at 4 and 5, these being carried directly by the base 1 ordinarily at the front thereof. I have shown contacts for receiving a fuse F of the cartridge enclosed type, but I do not necessarily so limit myself. Carried directly by the base 1 and located preferably at least in part in the space behind the plane of the rear face thereof are two switching devices which may be variously constructed as concerns certain of the broader phases of the invention. Preferably, however, each of these switch devices comprises two opposed stationary switch contacts and a rectilinearly movable switching means which includes a contact adapted to engage or disengage both of the stationary contacts to make or break the electrical connections between them. The preferred construction as shown is similar to the construction disclosed in my said Patent No. 1,754,443.

The opposed stationary contacts for one switch device are represented at 6 and 7 and the stationary switch contacts for the other switch device are indicated at 8 and 9. The stationary switch contacts 6 and 7 are carried by supporting elements 10 and 11 which project rearward from the base and which may be secured thereto by screws 12 and 13. The said screw 12 also holds the fuse contact 4 and provides electrical connection between the fuse contact and the corresponding switch contact. The screw 13 also engages and holds a small conductor plate 14 at the front of the base. The stationary switch contacts 8 and 9 are similarly carried by supporting elements 15 secured to the base by screws 16 and 17. The screw 17 engages and holds a plate 18 similar to the plate 14. Each of the switch contacts may be of a general U-shape and may be provided with a laterally extending flange engaging the corresponding supporting element. Screws or rivets 19, 19 extend through the flanges and into the supporting elements to hold the contacting portions in place. As illustrated the stationary switch contacts are positioned respectively below and above the lower and upper rear edges of the fuse carrying base.

The remaining fuse contact 5 is connected by riveting or otherwise with a conducting member 20, which conducting member is held in place on the base 1 by a screw 21. The said member 20 extends from the fuse contact to a point adjacent or beyond one edge of the base, and preferably the said member 20 is in the form of a strap which extends downward and laterally from the fuse contact terminating near one side of the base.

For making and breaking electrical connection between the stationary switch contacts of the two pairs there are provided two rectilinearly movable switch contacts which are preferably carried by a single flat insulating element as described in detail in my aforesaid Patent No. 1,754,443. The two movable switch contacts are shown at 22 and 23 respectively and the flat insulating element is shown at 24 the said insulating element with the movable switch contacts thereon constituting a switching member. The switching member is guided at the front by the base 1 and at the rear by the rear supporting wall. It will be understood that when the switching member is moved the two contacts 22 and 23 are moved to simultaneously engage and disengage the respective pairs of switch contacts 6 and 7, and 8 and 9 and thus make and break the electrical connection through the switching devices. It will be further understood that to break the circuit the switching members are moved in the upward direction from the positions shown in Figs. 1 and 3.

Connected respectively with the supporting element 11, with the end of the strap 20 and with each of the supporting elements 15, are wire connecting terminals 25, 26, 27 and 28. It will be obvious that the said terminals are electrically connected respectively with the switch contact 7 and the fuse contact 5, the switch contact 8 and the switch contact 9. For mounting the said terminals 25, 27 and 28 I have provided straps 29, 30 and 31 which project downward and upward from the base and which engages the respective supporting elements. The said straps are held by the aforesaid screws 13, 16 and 17. In addition there is a similar strap 32 connected with the supporting element 10 and held by the screw 12.

The description thus far has been chiefly confined to the fuse and switch parts at the right hand side of the fused switch unit. The parts at the left hand side are ordinarily similar except for reversal of positions and repetition of the detailed description is unnecessary. The reference characters are duplicated as applied to the parts at the left.

The fused switch device is preferably mounted in a suitable casing or cabinet such as the cabinet 33 shown in the drawings. The cabinet 33 is shown as being provided with a pivoted front cover 34 which is hinged to one wall as for instance the bottom end wall, so as to be openable to permit access to the switch and fuse parts. The cover may be locked in closed position by means of a latch 35 and if desired a seal may be inserted through the latch in the usual way to definitely prevent the opening of the cabinet except by breaking the seal. Suitable provision is made for the protective association of the cabinet with an electric meter. With a meter such as M the upper end wall 36 of the cabinet preferably has an opening therein of such size and shape as to substantially fit the terminal chamber portion of the meter, the said terminal chamber portion projecting for a short distance into the cabinet and substantially closing the said opening. Thus the cabinet serves as a means not only for protectively enclosing the switch and fuse parts but for also protectively enclosing a part of the meter and the connections between the switch and fuse parts and the meter.

I provide a suitable means for operating the switching members, this means being accessible at all times even though the switch devices are enclosed as preferred and as described. I have shown this operating means as comprising a spindle 37 which extends through an aperture in one side wall of the cabinet and which is provided with an operating handle 38 on the exterior of the cabinet. Within the cabinet the operating spindle 37 extends through bearing apertures in the brackets 2, 2 and is provided between the brackets with a cranked portion 39 which extends through a slot 40 formed in the insulating element of each movable switching member. When there are two switching members as shown, the one operating spindle 37 serves to operate both of them so as to make and break the respective circuit connections substantially simultaneously.

An appliance embodying the invention is particularly adapted, when associated with a meter as shown, to provide an electrical sequence of service wire-switch-meter-fuse-switch-load wire or an electrical sequence of service wire-switch-fuse-meter-switch-load wire. In Fig. 1 I have designated by dot-and-dash lines one arrangement of wiring connections which may be provided. The incoming service wires are designated S and two of them are connected respectively with the terminals 25, 25, the third wire being connected with a load wire in any desired way. One coil of the meter is connected between the terminals 26 and 27 at the right and the other coil of the meter is connected between the terminals 26 and 27 at the left. Two load wires L are connected respectively with the terminals 28, 28. It will be observed that with this arrangement of connections I provide an electrical sequence of service wire-switch-fuse-meter-switch-load wire. By making other connections as will presently appear I may provide an electrical sequence of service wire-switch-meter-fuse-switch-load wire. With the switching members in their "on" positions as shown in Figs. 1 and 3 the meter is connected in the circuit as above described. When the switching members are moved to their "off" positions the circuit is broken at both sides of the meter which is thus disconnected from both service and load wires.

The cover 34 of the cabinet is preferably provided with an opening through which the fuse contacts and the fuses are accessible when the cover is closed, the cover nevertheless keeping the switching devices and other parts accessible. The opening in the cover is shown at 41, the base 1 being so formed and positioned as to substantially close the opening when the cover is closed. As shown the base 1 has a barrier at the front which entirely surrounds the fuse contacts and the fuses and which extends forward to close the said opening 41. This barrier has at each side an opensided recess 42 therein through which the corresponding strap 20 extends, the strap having a forward off-set portion 20' adjacent the opening. As a result of the access to any of the live conducting parts construction as described it is substantially impossible for all practical purposes to obtain within the cabinet, except the fuse contacts and the fuses, after the cover has been closed and sealed.

Preferably an auxiliary cover is provided normally closing the opening 41 in the cover 34 and protecting the fuses. With the fuses connected ahead of the meter as illustrated in Fig. 1 it is preferable to provide a cover which positively prevents access to the said fuses except when the switches are open. Accordingly I have shown a transversely slidable fuse cover 43 which is held and guided by means of a member 44. The cover 43 is provided with a knob 45 by means of which it may be moved laterally. With the handle 38 in switch closing position the cover 43 is obstructed by the handle so that the cover cannot be opened to expose the fuses. However, when the handle is moved downward so as to move the several switching members upward to open the circuit the cover is then free to be moved laterally toward the right to permit access to the fuse contacts and the fuses; but with the cover thus moved laterally it is impossible to move the handle 38 upward to close the circuit.

I provide special means for directly connecting the respective service wires with the corresponding load wires independently of the switch contacts and independently of the meter. For this purpose I utilize the before-mentioned conductor plates 14 and 18, which are connected respectively with the terminals 25 and 28 by means of the screws 13 and 17 and the straps 29 and 31. Threaded into the respective plates 14 and 18 are screws 46 and 47 which are adapted to be used for clamping in place a suitable by-pass conductor or link (not shown). When links are clamped in place at both sides as described the service terminals 25, 25 are directly connected with the load terminal 28, 28.

It will be observed that with the said by-pass connections in place the movable switching members may be moved to the "off" position to open the normal circuit without, however, interfering with the supply of current to the load wires. With the switch members in their "off" positions the circuit is broken at both sides of the meter and the terminals of the meter coils are entirely freed from both the service and the load wires. The meter is then ready for testing in any usual or preferred way.

In order to facilitate the connection of instrument load for the testing of the meter I provide suitable test contacts. The test contacts may be variously constructed but as illustrated in Figs. 1 to 3 I use for this purpose screws 48, 49, 50 and 51 threaded into the respective straps 29, 30, 31 and 32. These screws serve for clamping the terminals of testing instrument leads which may thus be electrically connected with the respective meter terminals. It will be observed that the arrangement is such that the fuses are in the meter testing circuit.

For some methods of meter testing it is necessary to have the meter coils in electrical connection with the service wires but out of electrical connection with the load wires. In accordance with the present invention I provide means for establishing electrical connections between the service wires and the meter notwithstanding the fact that the switching members are in their "off" positions to break the normal connection between the service wires and the meter. To this end I provide means associated respectively with two pairs of switch contacts 6, 7 at the service side of the meter whereby the said contacts may be respectively by-passed when the switching member is in its "off" position. The said means comprises suitable contacts or holding devices for by-pass links. As shown the holding devices are such as to permit the attachment or the complete removal of the links, but as to this detail I do not necessarily limit myself. As shown the contacts or holding devices are the same screws 48 and 51 which have already been described. It will be observed that these screws may be used to hold links A and B as shown by dotted lines in Fig. 1. The contacts 6, 6 are at all times in connection with the respective meter coils through the corresponding fuses, and thus when the links A and B are in place the said meter coils are electrically connected respectively with the terminals 25, 25 and therefore with the corresponding service wires.

In Fig. 1 I have shown electrical connections providing a sequence of service wire-switch-fuse-meter-switch-load wire. As already stated it is possible by making other and differently arranged connections to provide an electrical sequence of service wire-switch-meter-fuse-switch-load wire. In order that either electrical sequence may be conveniently obtained without the necessity for changing the positions of the service and load wire connections, the base 1 together with the parts carried thereby is constructed so as to be easily reversible as set forth and claimed in my aforesaid Patent No. 1,757,741. With the base construction and mounted as shown reversal is made possible simply by removing the screws 3, 3. The base with all of the parts carried thereby is then turned through 180° and replaced on the brackets 2, 2. It will be understood that when the base is reversed the movable switching members are not reversed but remain in the positions shown in Figs. 1 and 2.

With the base in the reversed position as shown in the diagrammatic Fig. 4 the incoming service wires are connected respectively with the terminals 28, 28 and the load wires L are connected respectively with the terminals 25, 25. One meter coil is connected between the terminals 27 and 26 at one side and the other meter coil is connected between the terminals 27 and 26 at the other side. It will be observed that with this construction I provide an electrical sequence of service wire-switch-meter-fuse-switch-load wire without changing the positions of the service and load wire connections. This arrangement differs essentially from that shown in the other figures in that the fuse is connected after the meter instead of ahead of the meter. With the fuse connected after the meter it may be desirable to omit the interlocked cover and switch handle construction as shown in Figs. 1 to 3 and already described. In lieu of this construction there may be provided a simple hinged cover for the opening 51 in the main cover. This alternate cover construction is not shown as it constitutes no part of the present invention and is fully disclosed in the said Patent No. 1,757,741.

With the base reversed as shown in Fig. 4 the by-pass links between the service wires and the load wires may be connected exactly as already described. The links A and B when required are held in place by means of the screws 49 and 50 which are now at the bottom adjacent the service wires.

The construction shown in Figs. 5, 6 and 7 is similar to that shown in Figs. 1, 2 and 3 but differs in certain details. In view of the similarity the description will be confined to those details wherein the construction differs from the construction already fully described. The stationary switch contacts are supported directly on the base as described in connection with Figs. 1 to 3 but they are laterally offset from the fuse contacts. Each supporting element 10, instead of being held by the same screw 12 which holds the corresponding fuse contact 4, is held by a separate screw 52 spaced laterally from the screw 12. The said screws 12 and 52 engage a transverse conducting strap 53 which serves to establish the required electrical connection between the supporting element and the fuse contact. The supporting elements for the inner switch contacts of the upper pairs are similarly held by screws 54, 54.

The transversely extending conductors 20, 20 are omitted and in lieu thereof there are provided straps 20ª extending upward from the base at the back thereof and in substantial alignment with the fuse contacts 5, 5. These straps 20ª are held in place by means of screws 21ª which screws also serve to hold the fuse contacts 5, 5 and to establish electrical connections between the fuse contacts and the straps. Wire terminals 26ª, 26ª corresponding to the terminals 26, 26 are secured to the straps 20ª.

At the front on the base are plates 14ª, 14ª and 18ª, 18ª which are held in place by the screws 13, 13 and 17, 17 which also hold the corresponding supporting elements. The said plates 14ª, 14ª and 18ª, 18ª are extended upward and downward to carry wire terminals 25, 25 and 28, 28. Mounted on the front of the base and held in place respectively by the screws 52, 52 and 54, 54 are conductor plates 55, 55 and 56, 56, these plates being electrically connected by means of the said screws to the corresponding supporting elements and the switch contacts. Connected with the upper plates 56, 56 are wire terminals 27, 27.

For establishing by-pass connections between the service terminals and the load terminals the said plates 14ª, 14ª and 18ª, 18ª are extended upward and downward respectively and are provided with cap screws 46, 46 and 47, 47 adapted to be used for clamping in place by-pass links or conductors.

The plates 14ª, 14ª and 55, 55 are provided with screws 48, 48 and 51, 51 for the attachment of links such as the links A and B already described, and the plates 18ª, 18ª and 56, 56 are provided with similar screws 50, 50 and 49, 49.

It will be understood that except as stated the construction is or may be similar to that already described in connection with Figs. 1 to 3 and that the circuit connections and the manner of operation may be substantially the same. The base and the parts carried thereby may be reversed as already described, the wiring connections being then preferably similar to those shown in Fig. 4.

The construction shown in Figs. 8, 9 and 10 is similar in principle to those already shown and described, particularly that shown in Figs. 1 to 4, but it differs considerably in details, one of the chief differences being that the appliance is adapted for use with screw plug fuses F$^b$ instead of cartridge enclosed fuses. There is provided a base 1$^b$ which is mounted in the cabinet by means of brackets 2$^b$, 2$^b$ being held in place by means of screws 3$^b$, 3$^b$. The switch parts are connected with the base as already described and these switch parts may be similar in construction to those described except for necessary differences in size and proportion. The enclosing cabinet may also be similar to that already described.

The switch contact supporting elements 10$^b$ and 11$^b$ are respectively held in place by means of screws 12$^b$ and 13$^b$ and the switch contact supporting elements 15$^b$ are respectively held in place by means of screws 16$^b$ and 17$^b$. Each supporting element 10$^b$ is extended upward along the back of the base and is engaged by a screw 57 which also serves as the central fuse contact. The outer threaded fuse contact 58 is engaged by a flat forked conductor 59 which extends laterally as shown through a recess in the base.

Connected with each supporting element 11$^b$ at the bottom and the supporting elements 15$^b$ at the top are straps 29$^b$, 30$^b$ and 31$^b$, these straps being held by means of the screws 13$^b$, 16$^b$ and 17$^b$. Similar straps 32$^b$ are provided at the bottom and connected with the supporting elements 10$^b$ by means of the screw 12$^b$. Threaded into the straps 29$^b$, 30$^b$ and 31$^b$ are screws 25$^b$, 27$^b$ and 28$^b$ which constitute wire receiving terminals. A screw 26$^b$ is threaded into each conductor 59 and constitutes another wire receiving terminal.

The front cover 34$^b$ of the cabinet differs somewhat from the cover heretofore described in that it is provided with an inturned portion 39$^b$ which terminates at the front part of the base 1$^b$. This inturned portion 39$^b$ serves to enclose the forward projecting parts of the fuses F$^b$.

The electrical connections may be as indicated in Fig. 8, being similar to those already fully described in connection with Figs. 1 to 3. It will be understood that the base 1 and the parts carried thereby is reversible to facilitate electrical connections arranged as shown in Fig. 4.

Instead of providing screws for the clamping in place of by-pass connections and for the attachment of testing instrument leads I have provided test contacts by means of which by-pass connections and instrument leads can be connected in the usual way by means of the customary clips. Such test contacts are shown at 46$^b$, 47$^b$, 48$^b$, 49$^b$, 50$^b$ and 51$^b$. It will be understood that by means of these test contacts electrical connections may be established as already fully described in connection with Figs. 1 to 3.

What I claim is:

1. In a fused switch appliance, the combination of an insulating base normally located in spaced relationship to a rear supporting wall, a pair of fuse contacts on the base at the front thereof, upper and lower pairs of opposed stationary switch contacts carried directly by the base at the rear thereof and independently of the said rear wall, a switching member movable between the said base and the supporting wall and comprising two conducting elements respectively movable between the said contacts of the corresponding pairs to make and break electrical connections between them, service wire and load wire connectible terminals carried directly by the base and electrically connected one with one switch contact of one pair and one with one switch contact of the other pair, an electrical connection between one fuse contact and one of the other switch contacts, two other wire terminals carried directly by the base and electrically connected respectively with the remaining fuse contact and the remaining switch contact, the said terminals being adapted for the connection between them of a coil of an electric meter, and supporting means for the base permitting it with all of the parts carried thereby to be bodily reversed in position with respect to the said means so that the said fuse connected switch contact may be one of the lower pair or one of the upper pair.

2. In a fused switch appliance, the combination of an insulating base in normally fixed spaced relationship to a rear supporting wall, a pair of fuse contacts on the base at the front thereof, upper and lower pairs of opposed stationary switch contacts located at least in part behind a transverse plane through the rear part of the base and carried directly by the base independently of the said rear wall, a rectilinearly movable switching member located at least in part behind the said base and comprising two conducting elements normally engaging the switch contacts of the corresponding pairs to establish electrical connections between them, manually operable means for moving the said switching member substantially parallelly with the rear face of the base to disengage the conducting elements thereof from or to re-engage them with the said switch contacts, upper and lower wire terminals carried directly by the base and connected respectively with switch contacts of the two pairs, a wire terminal carried directly by the base and connected with one fuse contact independently of the switch contacts, an electrical connection extending directly between the other fuse contact and one switch contact of one pair, and supporting means for the base permitting it with all of the parts carried thereby to be bodily reversed in position with respect to the said supporting means so that the said fuse connected switch contact may be one of the lower pair or one of the upper pair.

3. In an electric meter service appliance, the combination of an insulating base, means for supporting the base in spaced relationship to a rear supporting wall, two pairs of opposed stationary switch contacts connected with the base at the rear thereof, a switching member movable between the said base and the supporting wall and comprising two conducting elements respectively movable between the said contacts of the corresponding pairs to make and break electrical connections between them, service wire and load wire connectible terminals carried directly by the base and electrically connected one with one switch contact of one pair and the other with one switch contact of the other pair, two other wire terminals carried directly by the base and electrically connected respectively with the remaining switch contacts, the said terminals being adapted for the connection between them of a coil of an electric meter, and two devices carried directly and entirely by the base and electrically connected respectively with the said service and load wire terminals and adapted for the attachment of a by-pass device to electrically connect the said terminals independently of the switch contacts and independently of the meter coil.

4. In an electric meter service appliance, the combination of an insulating base, means for supporting the base in spaced relationship to a rear supporting wall, two pairs of opposed stationary switch contacts connected with the base at the rear thereof, a switching member movable between the said base and the supporting wall and comprising two conducting elements respectively movable between the said contacts of the corresponding pairs to make and break electrical connections between them, service wire and load wire connectible terminals carried directly by the base and electrically connected respectively with the stationary switch contacts at one side of the switching member, two other wire terminals carried directly by the base and electrically connected respectively with the remaining switch contacts at the other side of the switching member, the said terminals being adapted for the connection between them of a coil of an electric meter, and two attachment devices carried directly and entirely by the base and electrically connected respectively with the said service and load wire terminals and adapted for the clamping of a by-pass link to electrically connect the said terminals independently of the switch contacts and independently of the meter coil.

5. In an electric meter service appliance, the combination of an insulating base, means for supporting the base in spaced relationship to a rear supporting wall, two pairs of opposed stationary switch contacts carried directly by the base at the rear thereof and independently of the said rear wall, a switching member movable between the said base and the supporting wall and comprising two conducting elements respectively movable between the said contacts of the corresponding pairs to make and break electrical connections between them, service wire and load wire connectible terminals carried directly by the base and electrically connected one with one switch contact of one pair and the other with one switch contact of the other pair, two other wire terminals carried directly by the base and electrically connected respectively with the remaining switch contacts, the said terminals being adapted for the connection between them of a coil of an electric meter, and two devices carried directly and entirely by the base and electrically connected respectively with the said service and load wire terminals and adapted for the attachment of a by-pass device to electrically connect the said terminals independently of the switch contacts and independently of the meter coil.

6. In an electric meter service appliance, the combination of an insulating base, means for supporting the base in spaced relationship to a rear supporting wall, a pair of fuse contacts on the base at the front thereof, two pairs of opposed stationary switch contacts carried directly by the base at the rear thereof and independently of the said rear wall, a switching member movable between the said base and the supporting wall and comprising two conducting elements respectively movable between the said contacts of the corresponding pairs to make and break electrical connections between them, service wire and load wire connectible terminals carried directly by the base and electrically connected one with one switch contact of one pair and the other with one switch contact of the other pair, an electrical connection between one fuse contact and one of the other switch contacts, two other wire terminals carried directly by the base and electrically connected respectively with the remaining fuse contact and the remaining switch contact, the said terminals being adapted for the connection between them of a coil of an electric meter, and two attachment devices carried directly by the base and electrically connected respectively with the said service and load wire terminals and adapted for the holding of a by-pass device to electrically connect the said terminals independently of the switch contacts and independently of the meter coil.

7. In an electric meter service appliance, the combination of an insulating base in normally fixed spaced relationship to a rear supporting wall, a pair of fuse contacts on the base at the front thereof, two pairs of opposed stationary switch contacts carried directly by the base at the rear thereof and independently of the said rear wall, a switching member movable between the said base and the supporting wall and comprising two conducting elements respectively movable between the said contacts of the corresponding pairs to make and break electrical connections between them, service wire and load wire connectible terminals carried directly by the base and electrically connected one with one switch contact of one pair and the other with one switch contact of the other pair, and electrical connection between one fuse contact and one of the other switch contacts, two other wire terminals carried directly by the base and electrically connected respectively with the remaining fuse contact and the remaining switch contact, the said terminals being adapted for the connection between them of a coil of an electric meter, two attachment devices carried directly by the base and electrically connected respectively with the said service and load wire terminals and adapted for the holding of a by-pass device to electrically connect the said terminals independently of the switch contacts and independently of the meter coil, and supporting means for the base permitting it with all of the parts carried thereby to be bodily reversed in position with respect to the said supporting means so that the said fuse connected switch contact may be one of the lower pair or one of the upper pair.

8. In an electric meter service appliance, the combination of an insulating base, means for supporting the base in spaced relationship to a rear supporting wall, a pair of opposed stationary switch contacts carried directly by the base at the rear thereof and independently of the said rear wall, a movable switching member comprising a conducting element movable between the said contacts of the corresponding pairs to make and break electrical connections between them, a wire terminal on the base connected with one stationary switch contact and adapted for the connection of a service wire, another wire terminal on the base electrically connected with the remaining stationary switch contact and adapted for connection with a coil of an electric meter, and two attachment devices carried by the base and electrically connected respectively with the said switch contacts and adapted for the holding of a by-pass device to electrically connect the service wire terminal with the meter coil terminal when the connection through the said switch contacts is broken.

9. In an electric meter service appliance, the combination of an insulating base, means for supporting the base in spaced relationship to a rear supporting wall, a pair of opposed stationary switch contacts carried directly by the base at the rear thereof and independently of the said rear wall, a movable switching member comprising a conducting element movable between the said contacts of the corresponding pairs to make and break electrical connections between them, a wire terminal on the base and connected with one stationary switch contact and adapted for the connection of a service wire, another wire terminal on the base electrically connected with the remaining stationary switch contact and adapted for connection with a coil of an electric meter, and two attachment devices carried by the base and electrically connected respectively with the said switch contacts and adapted for the clamping of a by-pass link to electrically connect the service wire terminal with the meter coil terminal when the connection through the said switch contacts is broken.

10. In an electric meter service appliance, the combination of an insulating base, means for supporting the base in spaced relationship to a rear supporting wall, two pairs of opposed stationary switch contacts carried directly by the base at the rear thereof and independently of the said rear wall, a switching member movable between the said base and the supporting wall and comprising two conducting elements respectively movable between the said contacts of the corresponding pairs to make and break electrical connections between them, service wire and load wire connectible terminals carried directly by the base and electrically connected respectively with the stationary switch contacts at one side of the switching member, two other wire terminals carried directly by the base and electrically connected respectively with the remaining stationary switch contacts at the other side of the switching member, the said terminals being adapted for the connection between them of a coil of an electric meter, and two attachment devices carried directly by the base and electrically connected respectively with the service wire connectible switch contacts and adapted for the holding of a by-pass device to electrically connect the service wire terminal with one of the meter coil terminals when the circuit through the said switch contacts is broken.

11. In an electric meter service appliance, the combination of an insulating base in normally fixed spaced relationship to a rear supporting wall, a pair of fuse contacts on the base at the front thereof, two pairs of opposed stationary switch contacts carried directly by the base at the rear thereof and independently of the said rear wall, a switching member movable between the said base and the supporting wall and comprising two conducting elements respectively movable between the said contacts of the corresponding pairs to make and break electrical connections between them, service wire and load wire connectible terminals carried directly by the base and electrically connected one with one switch contact of one pair and the other with one switch contact of the other pair, an electrical connection between one fuse contact and one of the other switch contacts, two other wire terminals carried directly by the base and electrically connected respectively with the remaining fuse contact and the remaining switch contact, the said terminals being adapted for the connection between them of a coil of an electric meter, supporting means for the base permitting it with all of the parts carried thereby to be bodily reversed in position with respect to the said supporting means so that the said fuse connected switch contact may be one of the lower pair or one of the upper pair, and two pairs of attachment devices carried by the base and electrically connected respectively with the switch contacts of the said pairs, each pair of the said attachment devices being adapted for the holding of a by-pass device to electrically connect the corresponding switch contacts when the normal connection between the said contacts is broken.

In testimony whereof I have hereunto set my hand this 31st day of December, 1927.

JOSEPH SACHS.

CERTIFICATE OF CORRECTION.

Patent No. 1,790,322.    Granted January 27, 1931, to

JOSEPH SACHS.

It is hereby certified that error appears in the printed specification of the above numbered patent requiring correction as follows: Page 3, line 108, strike out the words "access to any of the live conducting parts" and insert same to follow line 110; page 7, line 94, claim 7, for the word "and" read an; page 8, line 72, claim 11, after "pairs" strike out the comma; and that the said Letters Patent should be read with these corrections therein that the same may conform to the record of the case in the Patent Office.

Signed and sealed this 10th day of March, A. D. 1931.

(Seal)

M. J. Moore,
Acting Commissioner of Patents.